March 28, 1961 T. H. WHALEY 2,977,216
ORE REDUCTION PROCESS
Filed Dec. 31, 1958
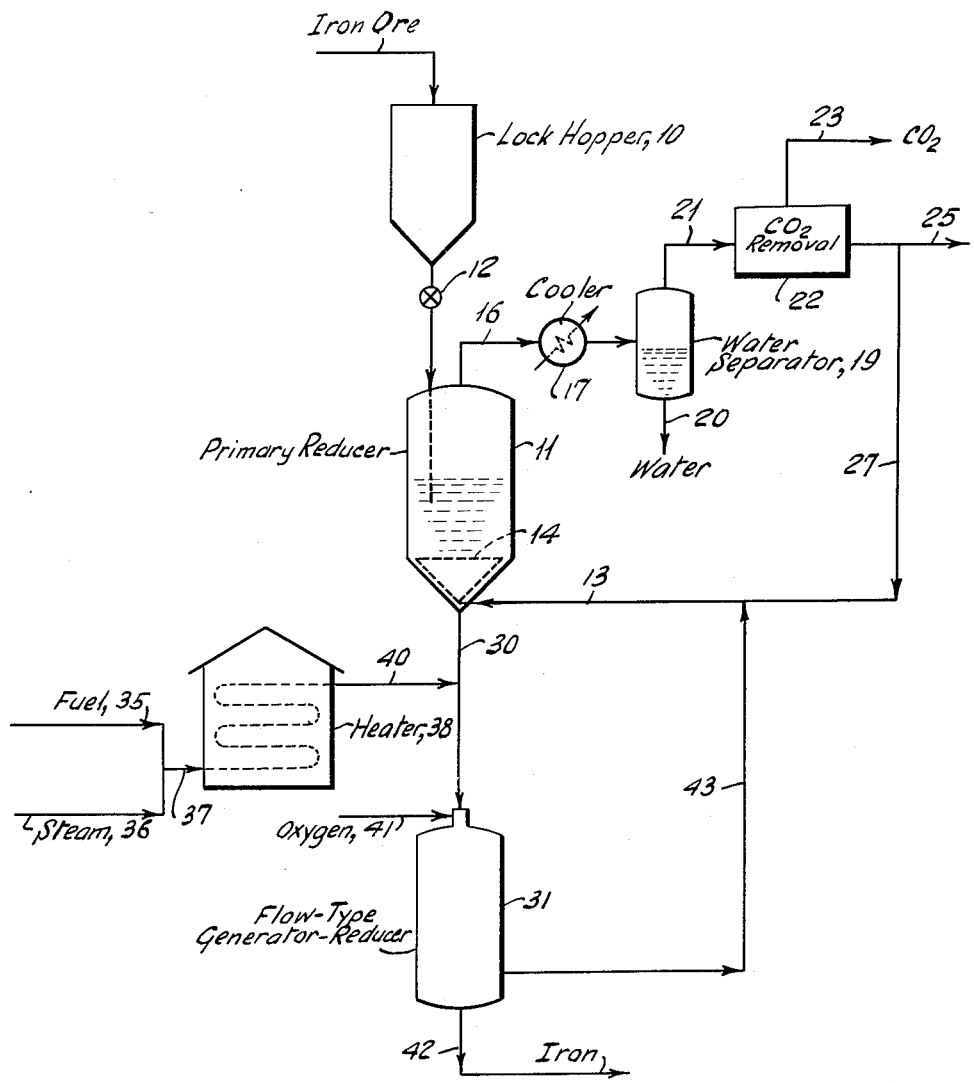

2,977,216

ORE REDUCTION PROCESS

Thomas H. Whaley, Mount Vernon, N.Y., assignor to Texaco Development Corporation, New York, N.Y., a corporation of Delaware Filed Dec. 31, 1958, Ser. No. 784,237

4 Claims. (Cl. 75—26)

This invention relates to a process for the reduction of metal oxides. In one of its more specific aspects it relates to a process for the reduction of a metal oxide which comprises contacting said metal oxide with a reducing gas in a first reduction zone effecting partial reduction of said metal oxide, passing said partially reduced metal oxide in admixture with a carbonaceous fuel and an oxygen-containing gas to a second reduction zone, effecting reaction of said metal oxide, carbonaceous fuel, and oxygen in said second reduction zone to form reducing gas and simultaneously reduce the metal oxide, separating the reduction product of said metal oxide and a gaseous effluent comprising carbon monoxide from said second reduction zone, and passing said gaseous effluent from said second reduction zone to said first reduction zone to comprise at least a part of the reducing gas therein.

For many years pig iron has been produced by the blast furnace process. In the blast furnace, a mixture of iron ore, coke and limestone is charged to the top of a vertical shaft type furnace and air or oxygen-enriched air is introduced at the bottom. Molten iron and slag are withdrawn from the bottom of the blast furnace and a gas produced is discharged from the top of the furnace. This blast furnace gas contains a large amount of sensible heat and in addition although it has a low heating value per unit of volume, it contains a tremendous amount of fuel energy because of the large amount of gas discharged.

Recently, methods have been disclosed for the reduction of iron ore in flow-type gas generator-ore reducers such as that disclosed in U.S. Patent 2,702,240 issued to H. V. Rees and F. B. Sellers. In the flow-type process as exemplified by this patent, a reducible metal oxide in powder form is dispersed in an oxygen-containing gas and contacted with oxygen and a carbonaceous fuel in suspension to produce reduced metal oxide and a gas comprising carbon monoxide and hydrogen. The flow-type generator-reducer process effects reduction at a very high rate in a relatively small reaction zone resulting in high throughput for a reaction furnace of a given volume.

In the process of the present invention, a reducible metal oxide in fine particle or powdered form is charged to a reducer and contacted with a hot reducing gas in a first contacting zone or primary reducer where it is heated and partially reduced. The hot partially reduced metal oxide is then reacted with a carbonaceous fuel and oxygen in a second zone comprising a flow-type generator-reducer at a temperature above about 2000° F. and preferably above the melting point of the reduction product to produce reduced metal and a reducing gas comprising carbon monoxide and hydrogen. Reducing gas from the flow-type generator-reducer is separated from the reduced metal and passed to the first zone to supply heat thereto and to comprise at least a part of the reducing gas therein. The initial reduction step of the present invention substantially reduces the fuel and oxygen requirements and increases the reduction capacity of a flow type generator-reducer.

In the primary reducer the metal oxide is reduced to a lower state of oxidation, for example, iron in the form of $Fe_2O_3$ is reduced to $FeO$. Simultaneously the temperature is increased from the temperature prevailing in storage to a temperature within the range of about 1000 to 2600° F. The reducing gases employed in the primary reducer comprise effluent gases from the generator-reducer. The latter gases are produced at a temperature of about 2000 to 3000° F. Additionally, effluent gases from the primary reducer may be recycled in admixture with the hot generator-reducer gas to effect improved utilization of the gas and to control the temperature of the primary reducer. It is preferred to operate the primary reducer at a temperature of at least 1000° F. but below the temperature at which the solids become soft or agglomerating, although the primary reducer may also operate at a temperature above the melting point of the metal oxide.

The primary reducer advantageously may comprise a fluidized bed or a moving bed of solids. The turbulence prevailing at a fluidized bed of solids effects rapid transfer of heat from the hot gases to the solids and efficient contacting for rapid reduction. Metal oxide, for example, iron ore, charged to a fluidized bed reducer is suitably ground to a particle size within the range of about 10 to about 300 mesh average particle size. Hot reducing gas is passed upwardly through the fluidized bed of solids at a superficial velocity within the range of about 0.5 to about 3 feet per second (superficial velocity is that velocity which is calculated from the rate of gas flow and vessel dimensions assuming that no solids are present in the vessel).

A moving bed process may be employed for the primary reduction step of this process. By employing reducing gas superficial velocities below about 0.5 foot per second, the solids pass downflow through the reducer without substantial backmixing. This permits countercurrent contacting of the solids and gas so that the temperature of the solids withdrawn from the bottom of the reducer may approach the temperature of the reducing gas and the most completely reduced oxide is contacted with the fresh gas.

Alternatively, though generally less desirably, a molten mass of metal oxide may be maintained in the primary reducer, into which the hot reducing gas is jetted, preferably centrally from above and with the fresh feed in particle form, suitably preheated, fed onto the top of the molten mass along its peripheral edges.

Partially reduced metal oxide is passed directly from the primary reducer to the flow type generator-reducer. Fuel for the flow-type generator-reducer may comprise a carbonaceous fuel, for example, hydrocarbon gases, liquids, coals, coke and other fuels from petroleum or coal sources. Optionally steam may be employed as dispersion medium or as transfer medium to introduce the fuel into the flow-type generator-reducer. It is generally desirable to preheat the fuel or steam-fuel mixture before introduction into the generator-reducer in order to reduce the heating load therein. Advantageously, the preheated partially reduced oxide from the primary reducer is introduced in solid fine particle form into the flow-type generator-reducer in the form of a suspension with the fuel, steam and oxygen containing gas. In the case the primary reducer is operated at temperatures above the melting point of the metal oxide, the molten oxide is permitted to flow into the generator-reducer and the reducing gas produced by partial oxidation of the fuel jetted into the molten metal-metal oxide mixture. In this latter case, the final reduction is best carried out with batchwise operation; during final reduction of one batch, sufficient partially reduced metal oxide is accumulated in the primary reducer to charge the generator-reducer with the next batch.

In the generator-reducer, the partially reduced metal oxide, fuel, oxygen, and steam are reacted autogenously at a temperature within the range of about 2000 to about 3000° F. to produce a gas comprising carbon monoxide and hydrogen and metal or a lower oxide of the metal. The metal oxide reduction products are usually removed from the generator in molten form either separately or entrained in the product gases. When the generator-reducer is operated at temperatures below the melting point of the reduction product, solid products may be removed entrained in the gaseous products. With iron oxide or iron ore, it is preferable to operate the generator-reducer at a temperature of about 2500° F. or higher and to draw off both iron and slag in molten form.

Suitable metal oxides include those generally which may be reduced by contact with carbon monoxide and hydrogen, for example, iron, copper, vanadium and barium. In reducing a metal oxide which exhibits several oxidation states, for example, iron oxide, the partial reduction in the first reduction step advantageous effects reduction from one state to another; in the case of iron oxide, from ferric oxide, $Fe_2O_3$, to ferrous oxide, $FeO$. However, the metal oxide need not have more than one oxidation state inasmuch as the process of this invention is applicable in general to the reduction of metal oxides in two stages wherein a part of the reduction is effected in the first stage and the desired reduction is completed in a flow-type generator-reducer.

The accompanying drawing diagrammatically illustrates one form of the process of this invention. Although the drawing illustrates one arrangement of apparatus in which the process of this invention may be practiced it is not intended to limit the invention to the particular apparatus or materials described.

Iron ore, from an external source not shown, is introduced into lock hopper 10. From lock hopper 10, iron ore is fed into the fluidized bed of primary reducer 11 through valve 12. Reducing gas in line 13 is passed through distributor cone 14 and introduced into the fluidized bed in primary reducer 11. Effluent gases are withdrawn from the primary reducer 11 through line 16 and cooled in heat exchanger 17 which may comprise a waste heat boiler for the generation of useful steam. Cooled effluent gases are discharged into water separator 19 for the removal of condensed water. Water is discharged through line 20. Gases from separator 19 are discharged through line 21 to carbon dioxide removal facility 22 which may comprise, for example, a conventional amine scrubbing system. Carbon dioxide is discharged through line 23 for disposal. Carbon monoxide and hydrogen are discharged through line 25 for use not shown and a recycle stream of carbon monoxide and hydrogen is passed through line 27 and line 13 to the primary reducer.

Solid particles of partially reduced iron ore from primary reducer 11 are withdrawn from the fluidized bed and passed through standpipe 30 to generetor reducer 31. Fuel, for example, bunker fuel oil in line 35 is combined with steam from line 36 and the mixture passed through line 37 to heater 38. In heater 38 the steam and fuel are intimately mixed and heated to a temperature of about 800° and passed through line 40 into admixture with the partially reduced ore in line 30. Oxygen is introduced to generator-reducer 31 through line 41. The oxygen, fuel, steam and partially reduced ore react in generator reducer 31 to form metallic iron and gaseous products comprising carbon monoxide and hydrogen. The metallic iron, above its melting point, is collected in molten form at the bottom of generator-reducer 31 and is withdrawn through line 42. Gaseous carbon monoxide and hydrogen is withdrawn through line 43 and passed in admixture with recycle gas in line 27 through line 13 to primary reducer 11.

The following example illustrates the application of the process of this invention to the reduction of iron ore employing a moving bed primary reducing zone and a flow-type generator-reducer secondary reducing zone. A low phosphorus iron ore from Mesabi range comprising 90.2 percent iron basis $Fe_2O_3$, 7.4 percent silica and 1.5 percent moisture is introduced at the rate of one ton per hour through a lock hopper into a moving bed reducing zone. Northern Michigan limestone comprising 97.3 percent calcium carbonate is ground to pass a 10 mesh screen and is passed to the primary reducer at a rate of 236 pounds per hour in admixture with the ore. The ore and limestone are introduced at the top of the primary reducer and move downwardly countercurrently to the upward flowing reducing gas. Reducing gas from the secondary generator-reducer at a rate of 54,100 standard cubic feet per hour is introduced at the bottom of the primary reducer. Gas comprising 33.3 percent hydrogen, 43.6 percent carbon monoxide, 16.0 percent water vapor and 6.0 percent carbon dioxide at a rate of 55,000 standart cubic feet per hour is discharged from the top of the primary reducer at a temperature of about 1000° F.

At the base of the downwardly moving bed, the ore is reduced substantially to ferrous oxide. The partially reduced ore with a proportional amount of lime is withdrawn from the base of the primary reducer.

A fuel oil having a gravity of 16.4° API at a rate of 126 gallons per hour is admixed with water at a rate of 30 gallons per hours and the mixture is heated to a temperature of 800° F. forming a dispersion of oil in steam. The hot, partially reduced ore from the primary reducer is entrained in the steam-oil dispersion by combining the streams in a venturi section at high velocity and passed directly to a flow type generator-reducer. Oxygen of 96.5 percent purity, at a rate of 796 pounds per hour is preheated to 800° F. and passed into flow type generator-reducer and contacted with the steam-oil dispersion and entrained partially reduced iron ore. The oil, steam, oxygen, and ore react at an autogenous temperature of about 2600° F. to form molten iron and gaseous products comprising carbon monoxide and oxygen. The iron is withdrawn and cast into pigs having a composition of 97.5 percent iron, 0.9 percent silicon and 1.4 percent carbon at a rate of 1,295 pounds per hour. Slag at the rate of 269 pounds per hour is also separated. Gaseous products of the generator-reducer comprising 47.4 percent carbon monoxide, 41.5 percent hydrogen and 7.5 percent water vapor at a temperature of 2600° is passed at a rate of 54,106 cubic feet per hour directly to the primary reducing zone. Effluent gas from the primary reduction zone is cooled and water and carbon dioxide are separated to form a product gas. The product gas comprising 42.9 percent hydrogen and 56.1 percent carbon monoxide and having a heating value of 318 B.t.u. per cubic foot is discharged at a rate of 42,700 standard cubic feet per hour.

Obviously many modifications and variations of the invention, as hereinbefore set forth, may be made without departing from the spirit and scope thereof and, therefore, only such limitations should be imposed as are indicated in the appended claims.

I claim:

1. A process for the reduction of a reducible solid metal oxide selected from the group consisting of iron, copper vanadium and barium oxides which comprises contacting said metal oxide in particulate form with a reducing gas comprising carbon monoxide and hydrogen in a first reduction zone at a temperature sufficient for effecting partial reduction of said metal oxide; passing said partially reduced metal oxide out of said first reduction zone into admixture with a carbonaceous fuel; passing the resulting admixture of partially reduced metal oxide and carbonaceous fuel as a stream into a second reduction zone while bringing an oxygen-containing gas into contact therewith; effecting reaction of said partially reduced metal oxide, carbonaceous fuel and oxygen in said second reduction zone at a temperature above about 2000° F.

and above the melting point of said metal to produce said metal in a molten condition and under conditions such as to generate sufficient hydrogen and carbon monoxide both to reduce said partially reduced metal oxide in said second reduction zone and to heat said first reduction zone and partially reduce the ore therein; removing from said second reduction zone the molten metal reduction product of said metal oxide, and a hot gaseous effluent comprising hot carbon monoxide and hydrogen at a temperature of about 2000 to 3000° F., and passing said hot gaseous effluent from said second reduction zone to said first reduction zone to comprise the reducing gas therein and to heat said metal oxide therein.

2. A process in accordance with claim 1 wherein said solid metal oxide is iron oxide.

3. A process in accordance with claim 1 also comprising separating effluent gas containing residual hydrogen and carbon monoxide from said first reduction zone, removing water and carbon dioxide from said effluent gas, and then recycling at least a part of said effluent gas back into said first reduction zone.

4. A process in accordance with claim 3 wherein said hot gaseous effluent from second reduction zone is mixed with said recycled gas prior to introduction thereof into said first reduction zone.

References Cited in the file of this patent

UNITED STATES PATENTS

| | | |
|---|---|---|
| 2,481,217 | Hemminger | Sept. 6, 1949 |
| 2,560,470 | Ogorzaly | July 10, 1951 |
| 2,702,240 | Rees et al. | Feb. 15, 1955 |
| 2,711,368 | Lewis | June 21, 1955 |
| 2,752,234 | Shipley | June 26, 1956 |

FOREIGN PATENTS

| | | |
|---|---|---|
| 573,539 | Great Britain | Nov. 26, 1945 |